United States Patent [19]
Monson

[11] Patent Number: 5,721,679
[45] Date of Patent: Feb. 24, 1998

[54] HEADS-UP DISPLAY APPARATUS FOR COMPUTER-CONTROLLED AGRICULTURAL PRODUCT APPLICATION EQUIPMENT

[75] Inventor: Robert J. Monson, Saint Paul, Minn.

[73] Assignee: Ag-Chem Equipment Co., Inc., Minnetonka, Minn.

[21] Appl. No.: 574,288

[22] Filed: Dec. 18, 1995

[51] Int. Cl.⁶ .................................................. G06F 165/00
[52] U.S. Cl. .................................. 364/424.07; 364/449.2; 345/7
[58] Field of Search .................... 364/424.07, 460, 364/449.2, 449.5; 345/7, 9; 340/995

[56] References Cited

U.S. PATENT DOCUMENTS

| | | | |
|---|---|---|---|
| 4,630,773 | 12/1986 | Ortlip | 239/1 |
| 5,005,009 | 4/1991 | Roberts | 340/705 |
| 5,128,659 | 7/1992 | Roberts et al. | 340/705 |
| 5,142,274 | 8/1992 | Murphy et al. | 340/705 |
| 5,210,626 | 5/1993 | Kumayama et al. | 359/13 |
| 5,212,471 | 5/1993 | McDonald | 340/705 |
| 5,214,413 | 5/1993 | Okabayaski et al. | 340/705 |
| 5,220,876 | 6/1993 | Monson et al. | 111/130 |
| 5,231,379 | 7/1993 | Wood et al. | 340/705 |
| 5,329,272 | 7/1994 | Massarelli et al. | 340/461 |
| 5,334,995 | 8/1994 | Iino | 345/7 |
| 5,357,263 | 10/1994 | Fischer et al. | 345/90 |
| 5,371,510 | 12/1994 | Miyauchi et al. | 345/7 |
| 5,375,663 | 12/1994 | Teach | 172/4.5 |
| 5,379,132 | 1/1995 | Kuwayama et al. | 359/13 |
| 5,414,439 | 5/1995 | Groves et al. | 345/7 |
| 5,471,391 | 11/1995 | Gudat et al. | 364/424.07 |

*Primary Examiner*—Michael Zanelli
*Attorney, Agent, or Firm*—Larkin, Hoffman, Daly & Lindgren, Ltd.

[57] ABSTRACT

A heads-up display (HUD) for a self-propelled agricultural vehicle or implement—particularly for applying a product to a field using a computer-controlled agronomic application system encompassing one or more application maps or animated map display systems—the heads-up display having a projection system relying upon selective refraction at the surface of the vehicle windshield (or a reflection-enhancing coating or screen applied to or used in lieu of projecting the animated map image directly on the windshield surface).

41 Claims, 4 Drawing Sheets

HEADS-UP DISPLAY APPARATUS FOR COMPUTER-CONTROLLED AGRICULTURAL PRODUCT APPLICATION EQUIPMENT

FIELD OF THE INVENTION

The present invention relates to a heads-up display (HUD) for a self-propelled vehicle used in conjunction with a computer-controlled agricultural product application system, and particularly to the use of such a heads-up display to present data, application maps, and other information to the vehicle operator during the process of applying agricultural products to a given field or terrain.

BACKGROUND OF THE INVENTION

Applying agricultural products such as seeds, fertilizers, pesticides, herbicides, and other nutrients or agents to fields using computer-controlled application equipment constituted one of the most prominent developments in the agronomic industry since it was initially suggested in U.S. Pat. No. 4,630,773 to Ortlip, as evidenced by subsequent refinements such as those described in U.S. Pat. Nos. 5,220,876 and 5,453,924 to Monson. The descriptions of the systems and methods for obtaining precise application of agricultural products contained in those patents is incorporated herein by reference.

Components for computer-controlled agronomic application systems can be roughly divided into two groups based upon whether raw initial data concerning factors such as soil type or nutrient levels are measured "on-the-fly" as the vehicle traverses the field dispensing products, or accumulated and processed into an agronomic plan that is subsequently utilized to control the application of products. A complete computer-controlled agronomic system may include components of either or both types.

The preferred computer-controlled agronomic system involves a multiple step process initiated when the farmer or a soil-testing service first establishes a grid map for a particular agricultural field, and then performs detailed soil testing at designated locations in the field corresponding to uniform grid coordinates. The soil test data may include a variety of information on the type of soil or geologic characteristics, pH, nutrient values, moisture content and retention characteristics, aeration, and any other factors that are deemed relevant to evaluating the characteristics of that field and preparing a suitable agronomic plan for the crop to be grown.

Given the soil test data and basic information on the crop to be planted, an agronomic plan is developed to optimize the expected yield from that field. The agronomic plan may be developed solely by the farmer, or the farmer working in combination with the local product representative or agronomist. Alternately, the agronomic plan may be developed based upon initial input from the farmer or product representative, which is then optimized and expanded using extensive forecasting capabilities and reference to a database contained in a remote agronomic system maintained by an agronomic consulting service.

In its simplest form, the agronomic plan may contain recommendations for seed variety or hybrid, planting density, and the periodic application of one or more fertilizers, herbicides, pesticides, or other products at varying rates or densities throughout the field in order to attain the most desirable distribution of nutrients and other materials in the field to promote maximum crop yield, as well as minimizing any waste or excess application of those products.

At more complex levels, the agronomic plan may include an evaluation of historic meteorological patterns and regional long-range predictions, prior crop planting and harvesting information, hybrid characteristics, statistical analysis of geologically- and climatologically- similar fields, potential product interactions, and a host of other empirical and qualitative relationships that have a measurable impact on current crop production, future soil maintenance, conservation, and environmental conditions.

The result is an agronomic plan that dictates a schedule of products or treatments to be applied to the field given a particular crop to be planted. The variable amounts of each product to be applied throughout the field are reduced to a number of "application maps" that may be read by a computer-controlled application system on a vehicle to automatically and independently adjust the application rates for the products as the vehicle traverses the field, thus ensuring that the desired density is achieved for each product applied throughout the field. Application of those products or treatments may start before planting, and may continue after harvesting in preparation for subsequent crop cycles. Depending upon the complexity of the system and the agronomic plan, some of that information may be retained in the farmer's mind, compiled into a written document or printout, or contained in a computer program that is periodically consulted, updated, or modified by the farmer, product representative, application service, or agronomic consulting service. Yield data may be mapped onto the same grid and subsequently used to gauge the effectiveness of the agronomic plan and modify future plans or forecasts. The agronomic plan may be maintained as a longitudinal evaluation of the agricultural history for a given field, and optimized over time given the accumulation of empirical data, refinements in statistical analysis, and enhanced predictive capabilities and agronomic algorithms.

The agronomic plan correlates the soil testing data and desired "target" conditions or field characteristics to a coordinate-type grid map of the field. The agronomic plan is then preferably reduced to one or more application maps, each map corresponding to a particular product to be applied to the field, and contains the information necessary to translate the desired target levels into control signals which adjust the independent application rates for each product to achieve the desired product density as the vehicle traverses the field at a non-uniform speed. It may be readily appreciated that for each additional product applied by the application system, the overlapping or "stacked" application maps will multiply the complexity of the potential blend combinations. This complexity grows further as the number of available density levels or gradations increases. In addition, GPS data (or other vectored location information) is converted to coordinate position, and input signals from various sensors monitoring vehicle speed and the status of valves, flow meters, and electrical or mechanical system components are constantly referenced against the application map to maintain or optimize system performance.

In addition to the sensors monitoring vehicle and equipment status, other sensors may be utilized to measure factors relating to the soil, climatological, environmental, or crop conditions. For example, moisture levels, nitrogen content, soil density or aeration, the presence of diseases or pests, temperature and barometric pressure, then-occurring precipitation, and many other factors can be measured during the actual product application procedure depending upon particular criteria that may be deemed pertinent. These measurements can be fed into the agronomic plan and the application rates or conditions for various products can be adjusted or optimized according to predetermined relationships or algorithms on a real-time basis. Some factors such as soil density and moisture level may be considered most pertinent during some operations such as planting, with the operation of the computer-controlled equipment being adjusted correspondingly, whereas other factors such as temperature, precipitation, wind speed and direction, and the localized distribution of a particular pest population may be more pertinent when applying a liquid herbicide or pesticide. A virtually limitless spectrum of control and automation over the application process can be provided due to the variety of data that can be generated and interrelated, the complexity of the agronomic plan and power of its algorithms, and the relative precision of the application equipment.

Regardless of the type of application procedure being undertaken, it is a practical necessity that some data or information be presented or displayed to the operator of the equipment during the procedure. There will usually be a minimal subset of data or information that must be presented to ensure proper application, and an expanded subset of optional information that may be made available to an operator. The expanded subset may include information that assists the operator in optimizing the system's performance, or data which may simply be of interest to the operator. The expanded subset may also include information that would augment the operator's knowledge or understanding about the particular field, or would have a subjective impact on the operator's perception of the field's condition or characteristics. This information may also prompt the operator to recognize previously unappreciated relationships or correlations regarding the field, particularly those involving historic or longitudinal information, and the system may allow the operator to interact with the agronomic plan to input information in response to this recognition in a manner that adds relevant information, algorithms, relationships, or expert system information to the GIS database or agronomic plan for later analysis and use.

The basic subset of information presented to the operator will usually include some type of navigational assistance, critical equipment status, and a display of the grid or application maps. Map displays could include a grid map, a simple soil-type map, an initial nutrient or field characteristic level map, an application map, or a result-oriented map that is updated in real-time to show the projected condition of the field based upon the application map and the completed portion of the product application.

Using the technology disclosed in the Ortlip '773 and Monson '876 patents, it has further proven desirable to utilize the concept of "map stacking" which permits one or more application maps to be overlaid onto any basic map type, as well as stacking several application maps to produce a composite presentation.

One example is a two dimensional application map divided into a multiplicity of uniform grid segments, with each grid segment having a unique color shade representing either the initial level of a nutrient or other characteristic, or the relative density of a product to be applied. Similarly, the same type of shaded map could be used to display a result-oriented map showing the status of the product application procedure at any given interval.

One application map for a particular product might contain anywhere from 2 to 200 or more separate gradations, depending upon the desired level of precision built into the system and the number of corresponding application rates or densities that may be accommodated by the application equipment. With several stacked application maps, the potential permutations theoretically increase geometrically, although the number of combinations actually employed in a given system will usually be somewhat less than the theoretical maximum. By overlaying separate colors, textures, or symbols for each application map, a composite map with a correspondingly higher degree of gradation may be achieved.

Figure 5:
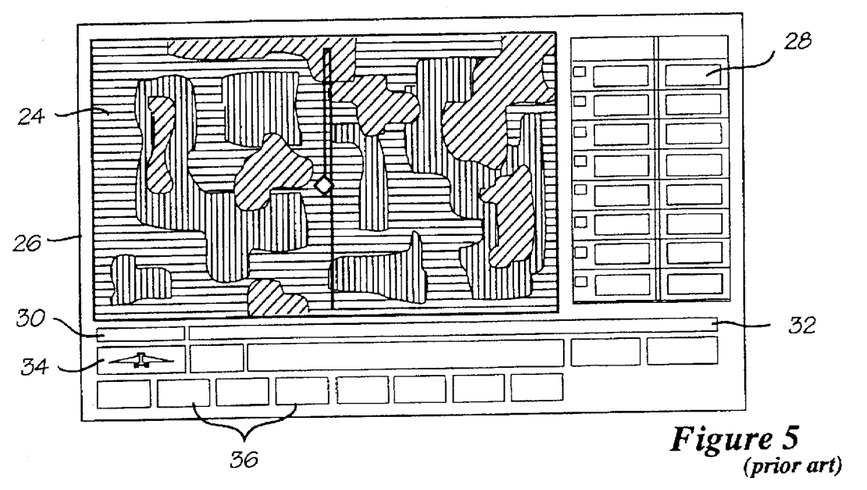
FIG. 5 is a diagrammatic plan view of a prior art two-dimensional application map and graphic user interface display screen for alphanumeric, pictorial, or symbolic data and information.
Figure 6:
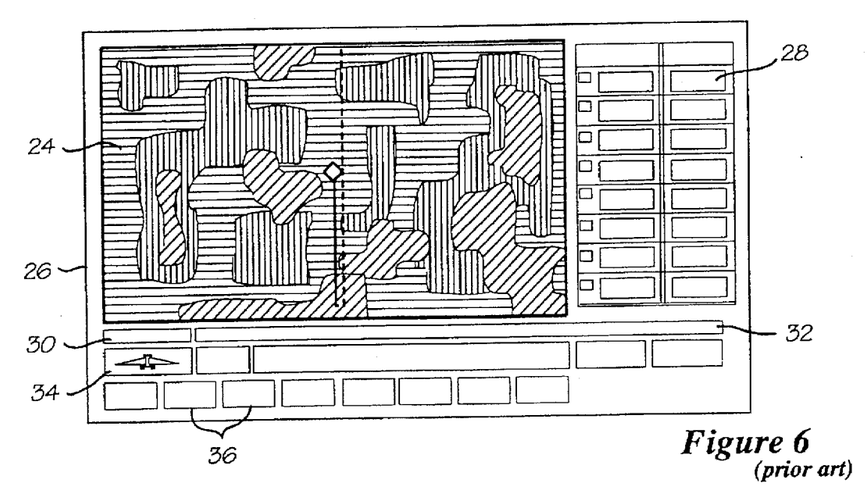
FIG. 6 is the diagrammatic plan view of the display screen of FIG. 5 with the application map inverted.

Referring to FIGS. 5 and 6, a representative example of a two dimensional composite application map is shown. Vertical, horizontal, and diagonal lining has been utilized in those Figures to designate three levels of gradation that appear as discrete zones, which would represent different levels or values for a particular field characteristic. In a conventional digital two-dimensional application map, the levels or values would be displayed as varying color shades, with a designated number of pixels corresponding spatially to each grid segment, and the shade of those pixels representing a level or value for the field characteristic. When viewed as a whole, various zones and patterns within the displayed map may be perceived due to the normal confluence or distribution of shades and the fact that field characteristics may tend to change only gradually from grid to grid. The effect is therefore similar to posterization of a digital bitmap image in which the posterization depth equates to the number of gradations in the measured level or value of the particular field characteristic.

Figure 3:
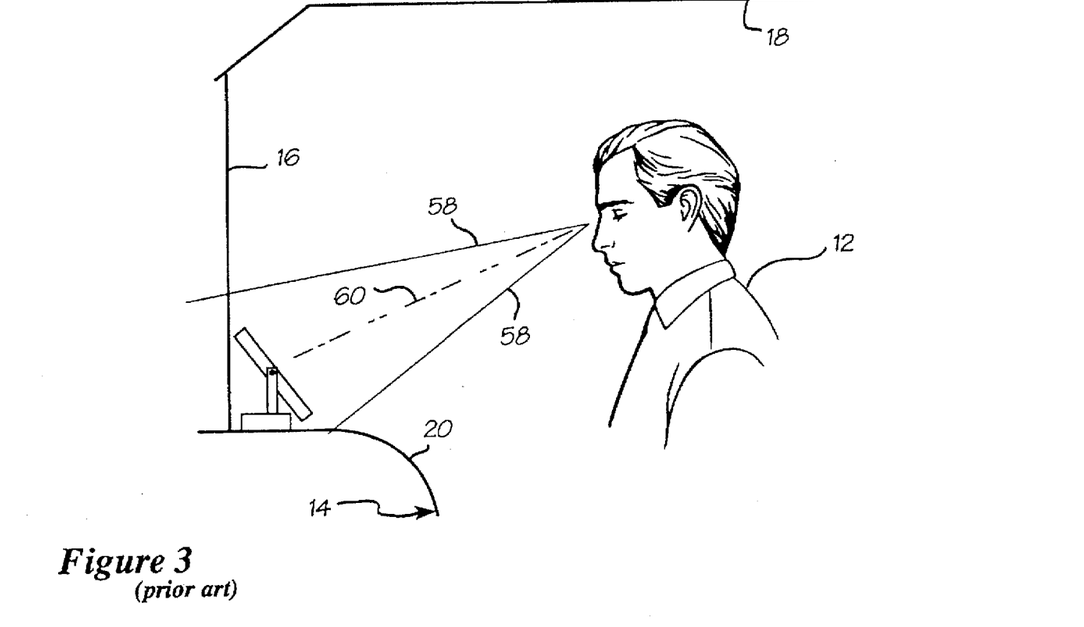
FIG. 3 is a diagrammatic side elevation view of a prior art vehicle cab, display, and operator torso as described herein.

Referring to FIG. 3, a representative example of a conventional data display used in a computer-controlled agronomic application system is shown. In this instance, the display is similar to that utilized with the Vision™ yield management system produced by Rockwell International of Cedar Rapids, Iowa. As may be seen in the Figure, the display is mounted on the dashboard or console of an agricultural vehicle (such as a combine, harvester, or fertilizer applicator), and provides a relatively small screen displaying a map or other data. This display requires the operator to redirect their view away from the field terrain as observed through the windshield of the vehicle, whether the display is placed on the dashboard, mounted overhead, or along one of the vertical cab risers. In the case of the configuration shown in Figure$_{13}$, the operator's attention is drawn downwardly from the terrain so that only a portion of the field is optimally visible in the operator's peripheral vision above the vehicle's hood, and the additional concentration or focus required to discriminate images on the display screen effectively negates any peripheral vision whatsoever.

Besides simply distracting the operator's attention from the field terrain and the path of the vehicle, there are several concomitant disadvantages presented by such a display system.

First, the ability of the operator to perceive and correlate information from the application map or other data displayed on the screen with their direct observation of the field conditions is impaired.

Second, translating bitmapped information from a two-dimensional display to match a real-world terrain that is being visualized from a moving vehicle inherently leads to substantial imprecision, if not errors of a greater magnitude.

Third, when patterns or subjective relationships are recognized, it is difficult if not impossible for the operator to effectively digest and then accurately translate or correlate that information to the two-dimensional application map or other register, regardless of the capacity and capabilities of the user interface.

Finally, it may also be appreciated that such a system presents inherent challenges regarding simple operations, such as vehicle navigation. For example, referring again to FIGS. 5 and 6, two recognized options for maneuvering the vehicle through the field and plotting the vehicle's course are shown. In the case of FIG. 5, the displayed map remains in a constant orientation relative to the operator, but a cursor and route marker reverse direction as the vehicle turns and traverses a parallel path but in the opposite direction. While this accurately reflects the vehicle's current position and path from a vector reference, the operator must mentally invert the map image (or view the map from the "top" of the screen) to properly orient the vehicle's position and direction relative to the map zones and patterns.

Conversely, as may be appreciated from FIG. 6, another option is to maintain a constant orientation (or even position) for the cursor and path marker on the screen, and rotate, invert, or translate the underlying map relative to the cursor depending upon the movement of the vehicle. While this solves the problem of correlating the operator's view of the field terrain to the upright orientation of the map image, it presents other problems. For example, a 180° turn at the end of any row will be presented as a mirror image of that turn once the map is inverted, and if the path marker extends along the entire portion of the field already traversed (or if the map is updated in real-time to reflect the product already applied) the operator can be easily become confused about the proper path along which to navigate the vehicle at subsequent turns. While this may be less problematical in a straight back-and-forth plan, any complex path or a field having non-rectangular boundaries or subdivisions can become very confusing. Moreover, the displayed portion of the application map may not show the boundaries of the field or other geographical references, and the operator may become easily disoriented without external reference to the actual terrain and field boundaries, geological or natural features, or physical structures. Similarly, as the map orientation changes, the operator's instinctive perception of factors such as compass heading, wind direction, and the actual location of geographical features or physical structures may result in disorientation, or require undue reliance on instrument navigation rather than intuition. If additional data must be displayed to compensate for the lack of intuitive perception, the result is to further distract the operator's attention from direct observation of the real-world terrain and field characteristics, or decrease the amount of time the operator has to consider and evaluate subjective factors. The resulting impact is to again diminish the operator's capacity to recognize patterns or relationships between data displayed on the application map and observations of real-world field characteristics.

In addition, the comparable complexity of the system itself and the operator's reliance on interacting with the system increase significantly, making the application procedure more difficult and concentration intensive rather than easier and more precise.

BRIEF SUMMARY OF THE INVENTION

It is therefore a goal of the present invention to provide a heads-up display (HUD) for use in projecting an animated map display that includes two- or three-dimensional maps and other data or information directly over the operator's view of the visible terrain and field conditions, to thereby provide a direct intuitive comparison between the map, data, or information being displayed and the observed conditions of the field. In addition, the heads-up display provides greater navigational assistance, safety, ergonomics, and improves the working environment for the vehicle operator.

Briefly described, the heads-up display is a projection system relying upon selective refraction at the surface of the vehicle windshield (or a reflection-enhancing coating or screen applied to or used in lieu of projecting the animated map image directly on the windshield surface).

DETAILED DESCRIPTION OF THE PREFERRED EMBODIMENTS

The method and apparatus of this invention are illustrated in FIGS. 1–8 and referenced generally therein by the numeral 10. In particular, the method and apparatus are preferably practiced in a manner that may be described with reference to two separate components: (1) an animated map display method which provides a visual representation of selected data and information relating to the agronomic application system in substantially real-time as the application vehicle traverses the field, and (2) a heads-up display apparatus that permits the animated map display to be projected and overlaid on the real-world image of the terrain and field viewed by the operator from the cab of the vehicle.

Figure 4:
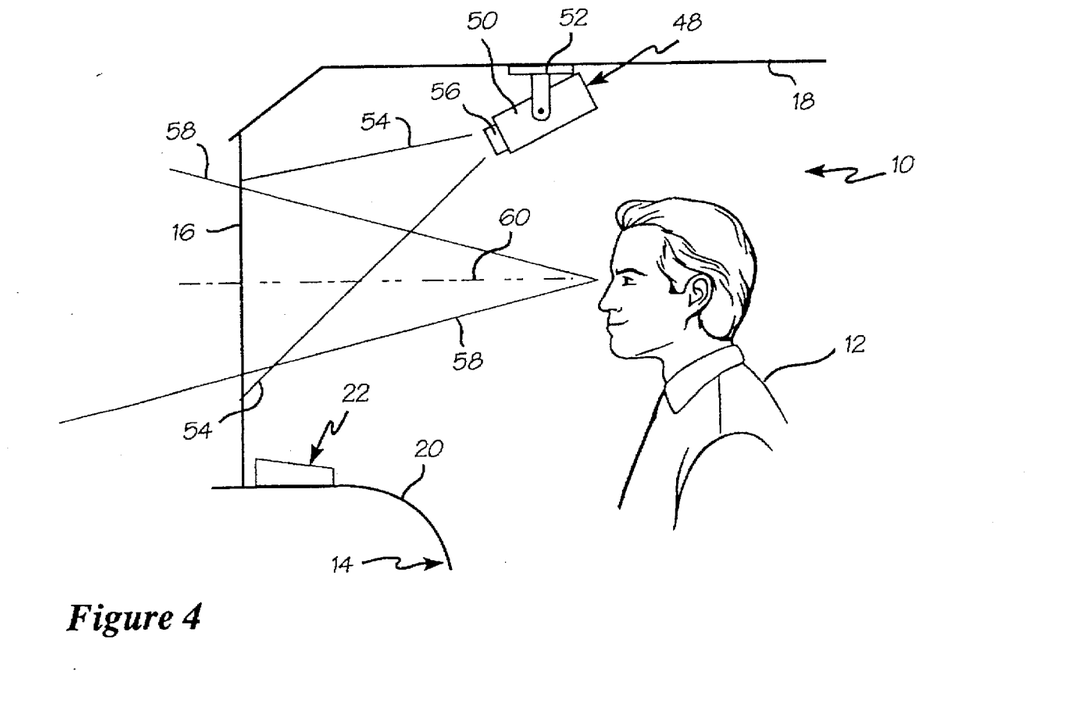
FIG. 4 is a diagrammatic side elevation view of a the vehicle cab, display, and operator torso for use with the animated map display method and heads-up display apparatus of this invention.

Referring particularly to FIG. 4, the agronomic application system is utilized by an operator 12 seated within the enclosed cab of an application vehicle 14 having a windshield 16, roof 18, and dashboard 20. In addition, the operator 12 is provided with steering controls, a throttle, and an onboard processing platform 22 for operating and controlling the agronomic product application system. The processing platform 22 may include one or more interactive interfaces such as a keyboard, mouse, and other components as described further herein. Depending upon the type of application equipment carried on the vehicle 14 and the agronomic system being used, the operator 12 will also be provided with other systems or components such as a coordinate- or vector-based navigation unit (GPS or LORAN) and a dead-reckoning backup system, communications, equipment controls and status displays, and so forth.

Animated Map Display

Referring particularly to FIGS. 3, 5, and 6, a two-dimensional static application map 24 is shown both in an upright and inverted configuration displayed on a conventional display screen 26 of the type that would be mounted on the dashboard 20 or in a similar position within the cab of the vehicle 14. In addition, there are several other items of data or information displayed on the screen 26 using conventional items found in a graphic user interface (GUI), including alphanumeric data cells distributed in rows and columns for identifying bin numbers, product application rates, densities, and product volumes 28, grid location 30, coordinate or GPS position 32, boom status 34, as well as other optional or interchangeable dialog or interface buttons 36 containing pictorial representations or alphanumeric data.

Figure 1:
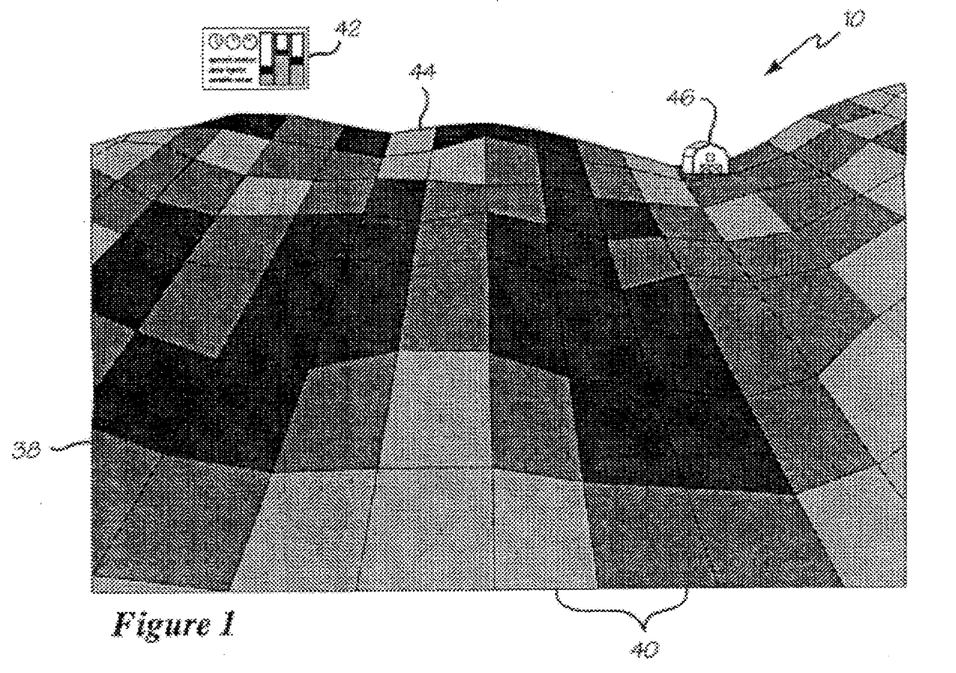
FIG. 1 is a diagrammatic perspective view of one embodiment of the animated map display method as projected by the heads-up display apparatus of this invention, the animated map display image being overlaid onto the real-world view of the terrain and field conditions for use in the agronomic application system as described herein, wherein a field characteristics are depicted by shaded grid zones.
Figure 2:
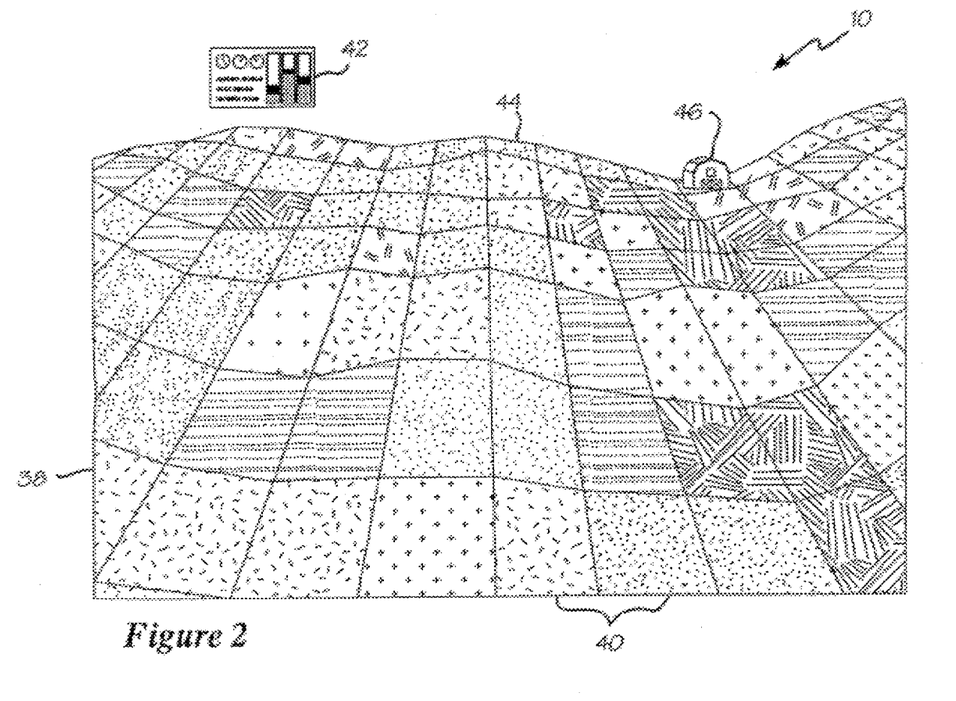
FIG. 2 is a diagrammatic perspective view of an alternate embodiment of the animated map display method of FIG. 1 as projected by the heads-up display apparatus of this invention, the animated map display overlaid onto the real-world view of the terrain and field conditions for use in the agronomic application system as described herein, wherein a field characteristics are depicted by patterned grid zones.

Referring particularly to FIGS. 1 and 2, two representative examples of simple animated map displays 38 are shown in which the conventional two-dimensional application or basic map 24 has been replaced by a three-dimensional animated map 38. In FIG. 1, the animated map 38 is composed primarily of uniform grid zones 40 that are shaded according to a predetermined scheme where the particular shading corresponds to a level or value for some known, measured, or predicted field characteristic. It may be readily appreciated that the animated map 38 may be a basic map (such as a grid map, soil type map, specified nutrient level, moisture content, or a map of any other basic field characteristic), an application map (showing the relative densities, mounts, or application rates for one or more products being applied to the field), or a result oriented map that is updated in real-time to show the projected condition of the field based upon the application map and the completed portion of the product application.

The operator 12 preferably may switch selectively between different maps 38 and different map types, and more than one map may optionally be displayed or projected for viewing at a given time, with multiple maps being overlaid and potentially interrelated as described further herein.

In addition to the uniform grid zones 40 and shading shown in the map 38, the animated map display may also present additional data or information 42 to the operator 12 in an alphanumeric, pictorial, or symbolic format. While the uniform grid zones 40 in FIG. 1 are shown in three levels or gradations of gray shading due to the limitations of black-and-white drawings, it may be appreciated that the uniform grid zones 40 may be shaded using a variety of colors, tints, patterns, and textures, and may include the same degree of gradation as previously described with reference to a conventional basic map or application map 24.

In addition, the animated map display 38 allows the presentation of information in other and potentially more subtle or even subconscious formats. For example, the area of the display disposed above the horizon line 44 corresponding to the sky in the operator's 12 direct view of the terrain and field may be shaded or patterned, with the color, tint, or other indicia representing any one of a number of measured or sensed values or conditions such as time of day, temperature, humidity, wind speed and direction, or then-occurring precipitation.

The animated map display 38 may also include references to various terrain-related objects 46 or conditions, such as fixed or movable physical structures (buildings, electrical towers or telephone poles, fencing, irrigation equipment, other vehicles carrying transponder elements, etc.), natural features (trees, terracing, etc.), geological or environmental features (lakes, rivers, creeks, hills, valleys, gullies, etc.), field boundaries, roadways, and any other terrain-related objects 46 or conditions that would aid in navigation or spatial referencing, present obstacles or hazards to the vehicle or operator, require real-time adjustment of the product application equipment (for example, based upon wind speed and direction when applying a liquid product), or which could potentially provoke a subjective recognition or appreciation of an agronomic relationship by the operator. In addition, other data such as historic yield information, pest population data, groundwater conditions, or other information may be projected with or as part of the animated map display 38 to elicit the subjective recognition of a previously unappreciated agronomic relationship by the operator 12.

Referring particularly to FIG. 2, a similar animated map display 38 is shown in which the uniform grid zones 40 have been shaded using a variety of known USGS cartographic and lithologic patterns. It may be appreciated that in place of or addition to the use of colors, tints, or shades, any distinguishable pattern or texturing may be utilized to visually convey pertinent information via the animated map display 38 to the operator 12. In this instance, the patterns such as those shown need not correspond to any accepted USGS standard for soil type or other cartographic or lithologic information, but instead may refer to any of the same types of information or data described above that might be displayed.

In instances where colored or shaded animated map displays 38 are utilized, stacking several maps 38 may be accomplished by utilizing higher orders of color or shading gradations to depict various combinations or interactions between the information contained in the various maps 38 or map types, including basic, application, and result-oriented real-time status maps. Alternately, some of the data or information may be displayed in pattern or texture format overlaid onto the color or shaded map, and thereby convey information in a visually distinguishable and recognizable manner. For example, a variety of cartographic or lithologic patterns such as shown in FIG. 2 may be used to present basic map information on soil type and moisture content, and colored or shaded grid zones 40 such as shown in FIG. 1 may be used to display levels or rates of product being applied.

It may be readily appreciated to those of skill in the art that the quality and complexity of the animated map display 38 may vary drastically depending upon the requirements of the particular application and the processing power that can be expended. At its most basic level, the animated map display could present a two-dimensional representation of a single field characteristic spatially plotted against the field-of-view of the operator 12 from within the vehicle 14. Alternately, at a much higher level, the animated map display 38 could present a seamless three-dimensional map without borders between uniform grid zones 40, with virtually infinite levels of shading, texturing, or patterning, animated and refreshed at a rate exceeding 15–30 frames per second such that it provides nearly one-to-one correlation with the real-world terrain and environmental conditions observed by the operator 12 within the normal field-of-view and peripheral vision provided through the windshield 16 (and side windows) of the vehicle 14.

Figure 8:
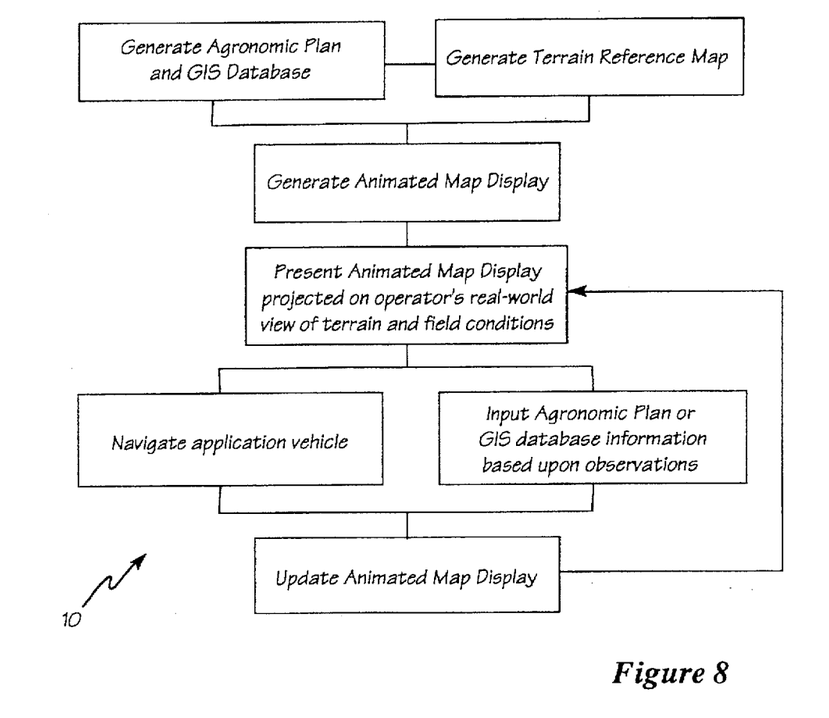
FIG. 8 is a flowchart showing the primary steps involved with generating and projecting an animated map display using the heads-up display of this invention.

Referring to FIG. 8, the basic flowchart steps in constructing and using the animated map display 38 are shown, although those of ordinary skill will appreciate that a variety of other processes and protocols may be applied to develop and implement the animated map display 38 in the forms described herein, or in other suitable forms depending upon the particular criteria and requirements of the given application.

Conventional processes are used to develop the agronomic plan, and in a situation where a three-dimensional animated map display 38 will be utilized it may also be necessary to initially generate a three-dimensional terrain reference map including field boundaries, elevations, terrain, objects 46, and so forth. There may be a relatively high degree of overlap and coordination between developing components of the agronomic plan (such as the grid mapping and soil sampling procedures) and inputting information necessary to generate the terrain map. Although a sprite-based terrain map and objects 46 may prove suitable for most applications in which a conventional VR-dedicated object-oriented programming language or scripting will be utilized to develop and implement the three-dimensional animated map display 38, it may also be desirable to obtain and input digital images of the terrain and objects 46 which may then be electronically mapped onto the sprites or programming objects to produce enhanced visual realism in the animated map display 38 as it is actually presented to the operator 12.

Based upon this background information and data, the animated map display 38 is generated as software or firmware and integrated into the agronomic plan or particular application maps to be run on the hardware or firmware processing platform 22 controlling the product application equipment on the vehicle 14.

Once loaded into the onboard processing platform 22 on the vehicle 14, the animated map display 38 is presented for visual observation or viewing by the operator 12. This presentation may be via a conventional liquid crystal display (LCD) screen, or as described herein the preferred approach is to project the animated map display 38 such that it is overlaid in a one-to-one spatial correspondence to the operator's 12 real-world view of the actual terrain and field. Additionally, the animated map display 38 could be presented using a virtual reality (VR) head-mounted display, or any one of a number of other presentation devices known to the art or hereafter developed.

Based upon the presentation of the animated map display 38, the operator 12 navigates the vehicle 14 through the field as various products are dispensed and applied to the field at precisely controlled but varying rates to achieve the desired target product densities in corresponding regions or zones of the field.

The operator 12 may selectively adjust the content or components of the animated map display 38 to control the volume and type of information that is presented.

The operator 12 may also selectively input data or information based upon visual observations of the terrain, field characteristics, real-world objects 46, or any subjective recognition or appreciation of agronomically significant relationships, patterns, or factors based upon visual perception, historical knowledge, and logical connections or intuited inferences that become apparent or are perceived during the application procedure. The operator 12 will enter this information into the agronomic plan or system data base in a manner dictated by the agronomic application system's program or user interface, using the most convenient input device.

One preferred option for the operator 12 to input information or data when the animated map display 38 is projected as a two- or three-dimensional representation overlaid over the real-world view of the terrain is the use of a spatial interface device (SID) that permits the operator 12 to effectively "draw" information onto the animated map display 38 in a manner that projects that information along with the animated map display 38. Examples of existing SIDs include the spatially-orientation mouse, infrared pointer, pressure- or capacitance-sensitive pads, or eye-sensing technology that translates movement of the user's fingers, hand, head, or eyes into coordinate positions on the display or presentation, and uses various types of activation or actuation (finger or eye movement, voice-activation, button clicking, or other methods) to responsively produce input operations, selections, controls, or prompts.

Based upon the physical movement or navigation of the vehicle 14 through the field, changes in the system status levels, and any periodic input of information from the operator 12, the animated map display 38 and agronomic application system are continuously updated, and the animated map display 38 is redrawn and the presented image is refreshed so that the projected image accurately corresponds with the current status level of the system and the physical orientation of the vehicle 14 and the operator's 12 view of the real-world terrain and field conditions.

Heads-Up Display Device

The preferred embodiment of the animated map display 38 described above contemplates presenting that animated map display 38 in a manner that may be readily visualized by the operator 12 during the application procedure. The heads-up display (HUD) 48 apparatus of this invention provides a means for accomplishing this presentation by projecting the image or images of the animated map display 38 overlaid with one-to-one spatial correspondence with the operator's 12 real-world view of the terrain and field through the windshield 16 (and optionally the side windows) of the cab of the vehicle 14.

This heads-up display (HUD) 48 may be readily contrasted with the conventional display shown in FIG. 3, as previously described herein. Referring to FIG. 4, the HUD 48 consists of a projector 50 mounted within the cab of the vehicle 14 on a bracket 52 in a position such that the projector may project an image 54 onto the windshield 16 of the vehicle 14, or alternately onto the side windows of the vehicle 14.

The HUD 48 may utilize a projector 50 of any type conventionally utilized for the presentation of graphical data, such as an LCD screen 56 through which visible light is directed to project a magnified image 54 on a physical surface. By projecting the enlarged image 54 onto an area the windshield 16 corresponding to the operator's 12 field-of-view 58 including the practical limits of useful peripheral vision in both the vertical and horizontal directions, the operator's 12 line-of-sight 60 may be maintained at a generally horizontal or level position rather than the markedly downward angle shown in FIG. 3 necessitated by prior art display screens.

Figure 7:
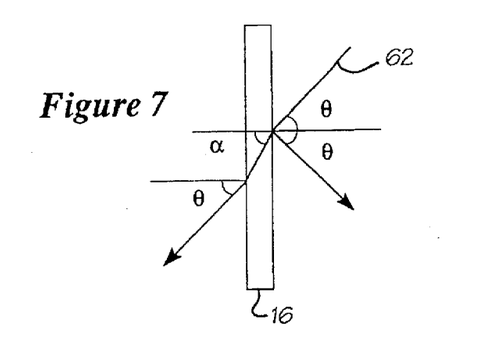
FIG. 7 is a diagrammatic view graphically depicting the reflectivity and refraction of an incident light beam on a pane of glass.

Referring particularly to FIGS. 4 and 7, it may be understood that in a rear-projection system for the HUD 48, the clarity and visibility of the projected image 54 will depend upon certain physical parameters and limitations, which will in turn dictate the selection and optimization of the projection angle, image intensity, and may affect choices of image coloration, shading, patterning, content, and other image criteria. The shape or curvature of the windshield 16 may similarly affect parameters such as the effective field-of-view 58, image 54 size, and so forth, although the preferred application vehicle 14 has a windshield 16 with a substantially flat interior surface. Thus, four factors (reflectivity of the surface on which the image is projected, luminosity of the display, distortion caused by the projector 50 or windshield 16, and location of the projector 50 and image 54) will control the suitability and desirability of the particular HUD 48 for use with the animated map display 38.

In particular, the expected reflectivity for visible light at an air-glass interface may be calculated with some precision. Referring to FIG. 7, a light beam 62 is shown passing through an air or gas atmosphere and incident at an angle θ relative to normal on a pane of glass 16 having a predetermine thickness. A portion of the beam 62 will be reflected by the first or incident surface of the pane 16 at an equal angle relative to normal. In cases where reflectivity is low, this reflected beam 62 may not be visible except in conditions where the background external to the pane 16 is extremely dark, and the incident beam 62 has relatively high intensity. Due to the intrinsic differences in the index of refraction between the air and glass, the angle α relative to normal of the beam 62 as it passes through the pane 16 will be slightly different than the angle θ of the incident beam 62 relative to normal. As the beam 62 subsequently passes from the pane 16 back to an atmosphere having the same initial index of refractive, the angle of the beam 62 relative to normal returns to the previous angle θ (i.e., parallel to the path of the original beam) but is linearly translated a distance proportional to the thickness of the pane 16.

Given specific values for the two indexes of refraction ($N_a$ for air and $N_b$ for the pane 16), there is a critical angle β corresponding to incident angle θ at which the pane 16 becomes predominantly or completely reflective (at least for purposes of projecting a luminous image 54 that is visible in normal daytime conditions). This relationship is then given as $\sin(\beta)^3$ $(N_a/N_b)$, or $\beta = \sin^{-1}(N_a/N_b)$. For a normal-air atmosphere having an index of refraction $N_a$ of 1.000292 and a pane 16 of crown glass having an index of refraction $N_b$ of 1.56, the critical angle β is therefore 39.88 degrees (39.87 degrees using an index of refraction $N_a$ for air of 1.0, or 39.9 degrees using three significant digits in either instance).

The effective refractive indexes may also be affected by coating or placing a thin-film material on one or both surfaces of the windshield 16 designed to enhance the visibility of the projected image 54. This coating or thin-film material may be utilized to decrease the amount of transmitted light entering the cab through the windshield 16 or windows from the exterior, or to increase the effective reflectivity of the windshield 16. In the latter case, the coating or thin-film material may be considered the actual surface of the windshield 16 on which the image 54 is projected. Similarly, if a separate transparent or highly-translucent projection screen (not shown) is disposed between the operator 12 and the windshield 16 for projecting the image 54, then that screen may be considered the actual surface through which the operator 12 views the real world terrain, field conditions or characteristics, objects, and environment regardless of the presence of a separate windshield 16.

Once optimal conditions are established based upon the location and orientation of the projector 50 and the properties of the pane 16, coatings, thin-film materials, or screens, refinements to the HUD 48 may be made by adjusting the intensity and color of the projected image 54, the relative size and location of the image 54 within the field of view 58, and other factors depending upon environmental conditions, operator 12 ergonomics, and the like.

Although generally cost-prohibitive for use in a computer-controlled agronomic system at the current time, other types of equipment may be utilized to fabricate the heads-up display 48 apparatus as disclosed herein. For example, a thin-film active- or passive-matrix liquid crystal display screen that conforms substantially in shape and size to the field of view 54 of the operator 12 at the position of the windshield 16 may be attached to or disposed immediately in front of the windshield 16 to present the animated map display 38. Alternately, a head-mounted VR display apparatus could be utilized, however the majority of current designs for commercially available head-mounted VR displays that would be economically feasible for this application are not deemed suitable for use in a self-propelled vehicle due to potential risks associated with disorientation, inner ear structure (IES) induced nausea, damage to or impairment of visual acuity due to long-term or extended use, or the relative opacity of the screen (i.e., lack of adequate "see-through" capabilities). However, some commercial systems such as are currently being utilized for projecting televised images onto head-mounted displays similar to conventional eyeglasses may prove suitable for some applications.

Figure 9:
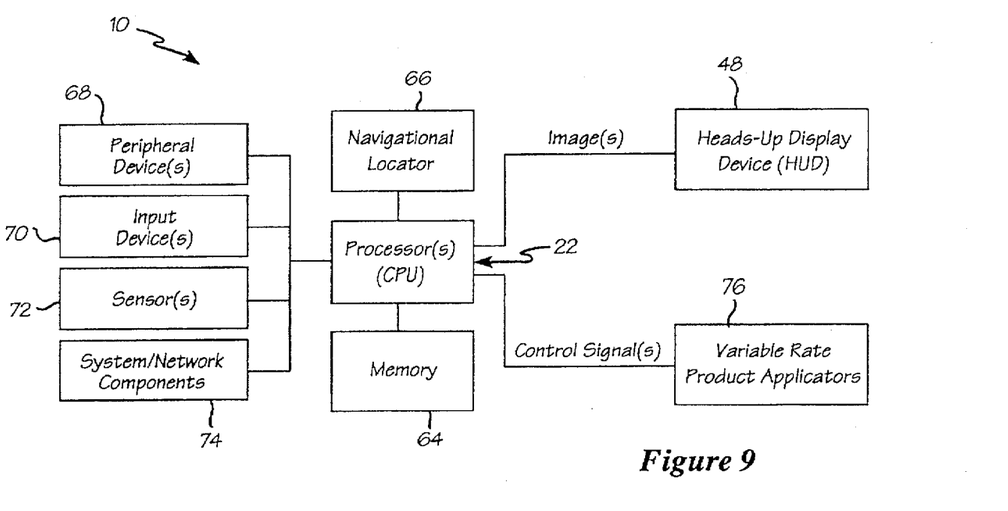
FIG. 9 is a diagrammatic representation of the system components for use with the heads-up display of this invention.

Finally, referring to FIG. 9, an overview of the system components for practicing the invention are shown. The processing platform 22 may be composed of one or more general purpose, RISC, or special application microprocessors located on a common board, distributed at various nodes in a network, or linked by appropriate buses or interfaces in an architecture that is most suitable to the particular application and operating system being utilized. For example, the systems and architecture described in the Monson '924 patent identified above and subsequent refinements therein have proven suitable. The processing platform 22 is operatively connected to at least one memory 64, and several discrete memories 64 may be utilized. The memory 64 retains or maintains the grid, terrain, and application maps, as well as other relevant data pertaining to the agronomic plan and for controlling the application of products. The memory 64 may also contain a geographical information system (GIS) database, or the GIS database may reside on media along with the relevant information regarding the agronomic plan, maps, and other information utilized in operating the system. A navigational locator system 66 (such as GPS, LORAN, etc.) is also operatively connected to the processing platform 22, the navigational locator system 66 determining a precise location within the vehicle at which the vehicle 14 resides at any given time. The navigational locator system 66 may also include supplemental navigation controls for navigating the vehicle by dead reckoning or other means when the primary navigational system is unavailable or not in use.

Several optional external interfaces may also be operatively connected to the processing platform 22. For example, a variety of peripheral devices 68 for data input and output such as magnetic or optical disk drives, a printer, or other conventional peripheral input/output devices 68, data input devices 70 such as the mouse, keyboard, pressure sensitive tablet, voice-actuation system, or other interactive input devices 70 as described above or known to the art, sensors 72 for measuring a variety of real-time data such vehicle speed, orientation, temperature or precipitation, bin or equipment status, flow rates, soil conditions, pest populations, and so forth, and other system/network components 74 such as a hard-wired, infrared, or RF communications link, a main or remote central processing unit (CPU), vehicle control systems, and so forth.

The processing platform 22 processes information using its operating system and resident program (or routines called from another system/network processing component 74), in addition to information from the agronomic plan and maps contained in memory 64 and location information derived from the navigational locator 66. The processing platform 22 generates the animated map display image 38 or images 38 that are fed to the heads up display device 48 for projection or presentation in a suitable manner for viewing by the operator 12. The processing platform 22 also generates one or more control signals that are fed to the variable rate product application equipment 76 to control the gates, relays, valves, pumps, dispensers, conveyors, spreaders, and other components utilized to distribute the products on the field at precisely controlled variable rates.

It may be readily appreciated that the processing platform 22 may include two completely distinct processing units to accomplish the image generation and control signal generation functions. Similarly, the processing platform 22 may determine vehicle position based upon information derived from the navigational locator 66 and sensors 72, or sensor 72 output relating to vehicle speed and orientation may be fed to a separate processing unit associated with the navigational locator 66 and used to generate a coordinate reference that is utilized directly by the processing platform 22 to generate the appropriate images for the animated map display 38 and control signals for the variable rate application equipment 76.

Although the present invention has thus been described in detail with reference to the preferred embodiments for practicing that invention, other embodiments, modifications, alterations, or substitutions deemed within the spirit and scope of the present invention may suggest themselves to those skilled in the art depending upon the particular applications involved.

It is therefore intended that the present invention be limited only by the properly attributable scope of the attached claims below.

What is claimed is:

1. An apparatus for displaying information to an operator of a vehicle used for distributing a product onto a field as said vehicle traverses said field, the distribution of said product being controlled at least in part in response to information contained in a map corresponding to regions of said field to receive varying densities of said product, said field defining a real-world terrain having features, said operator having a field of view encompassing at least a portion of said real-world terrain which changes over time as said vehicle traverses said field, said vehicle including at least one surface through which said operator views said portion of said real-world terrain, said apparatus comprising:

a memory, said memory storing at least a portion of the map;

a navigational locator, said navigational locator determining a position for the vehicle in the field at a given time relative to the map;

a processor, said processor converting information corresponding to said portion of the map into an image to be overlaid onto the field of view of the operator at said position in the field at the given time; and a heads-up display device, said heads-up display device projecting said image of said information onto the surface through which the operator views the portion of the real-world terrain such that said information is visible within the field of view of the operator overlaid onto the real-world terrain encompassed by the field of view of the operator, whereby the operator simultaneously views the real-world terrain and the information and selectively compares the information being projected with the features of the real-world terrain of the field.

2. The apparatus of claim 1 wherein the image is a graphical depiction of the map.

3. The apparatus of claim 2 wherein the map is an application map.

4. The apparatus of claim 1 wherein the product is applied to the field at a variable rate, and wherein the processor generates a control signal responsive to the location of the vehicle within the field, said control signal adjusting the variable rate in response to the agronomic plan.

5. The apparatus of claim 1 wherein the surface through which the operator views the real-world terrain is the windshield of the vehicle, and further wherein the heads-up display device is a projector mounted within the vehicle and oriented so that it projects the image onto said windshield such that the image is reflected and visible to the operator within the vehicle.

6. The apparatus of claim 5 wherein the projector includes a liquid crystal display through which visible light is projected.

7. The apparatus of claim 1 wherein the heads-up display device is a projector mounted within the vehicle and oriented so that it projects the image onto the surface such that the image is reflected and visible to the operator within the vehicle.

8. The apparatus of claim 7 wherein the image is projected on the surface in a manner such that the image substantially encompasses the field of view of the operator through the surface.

9. The apparatus of claim 7 wherein the operator is located at a position within the vehicle, said position being disposed generally between the projector and the surface on which the image is projected, the projector being disposed such that the operator does not substantially block the image projected onto the surface within the field of view of the operator.

10. In a system for distributing a product onto a field using a vehicle driven by an operator, the distribution of said product being controlled at least in part by a map corresponding to regions of said field to receive varying densities of said product, said map being maintained in a processor and containing information relating to an agronomic plan, said field defining a real-world terrain having features, said operator having a field of view encompassing at least a portion of said real-world terrain which changes over time as said vehicle traverses said field, the improvement comprising:

projecting at least a portion of the map within the field of view of the operator such that said portion of the map is overlaid onto the real-world terrain encompassed by the field of view of the operator, such that the operator may simultaneously view the real-world terrain and the map and selectively compare the information contained in the map being projected with the features of the real-world terrain of the field.

11. The improvement of claim 10 wherein the information contained in the portion of the map being projected in the field of view of the operator overlaid onto the real-world terrain comprises:

navigational information to assist the operator in navigating the vehicle throughout the field.

12. The improvement of claim 10 wherein the map includes a plurality of grid zones and the information contained in the portion of the map being projected in the field of view of the operator overlaid onto the real-world terrain comprises:

field characteristic information indicating a value for a predetermined field characteristic for each of the plurality of grid zones within the portion of the map being projected in the field of view of the operator.

13. The improvement of claim 12 wherein the predetermined field characteristic is a nutrient level.

14. The improvement of claim 12 wherein the predetermined field characteristic is a soil type.

15. The improvement of claim 12 wherein the predetermined field characteristic is a measurement value proportional to a density of the product being applied to the field.

16. The improvement of claim 12 wherein the predetermined field characteristic is a measurement value proportional to a rate of application of the product being applied to the field.

17. The improvement of claim 10 wherein the map is a grid map.

18. The improvement of claim 10 wherein the map is a soil map.

19. The improvement of claim 10 wherein the map is an application map.

20. The improvement of claim 10 wherein the map is a result-oriented map updated substantially in real-time to show a projected condition of the field based upon the amount of product that has been applied to the field in the corresponding ones of the plurality of grid zones.

21. The improvement of claim 10 wherein the map is updated by the processor substantially in real time as the vehicle traverses the field such that the portion of the map projected within the field of view of the operator generally corresponds spatially with the portion of the real-world terrain viewed by the operator.

22. The improvement of claim 21 wherein the portion of the map projected within the field of view of the operator generally corresponds with the entirety of the portion of the real-world terrain viewed by the operator.

23. The improvement of claim 10 wherein the real-world terrain includes a horizon line, and at least a portion of the information contained in the map being projected in the field of view of the operator is disposed above said horizon line from the perspective of the operator.

24. The improvement of claim 10 wherein the features of the real-world terrain include physical structures each having a location, and the map includes information corresponding to said location of said physical structures.

25. The improvement of claim 24 wherein the physical structures are generally stationary.

26. The improvement of claim 24 wherein the physical structures are generally mobile.

27. The improvement of claim 10 wherein the features of the real-world terrain include field boundaries each having a location, and the map includes information corresponding to said location of said field boundaries.

28. The improvement of claim 10 wherein the features of the real-world terrain include environmental features each having a location, and the map includes information corresponding to said location of said environmental features.

29. The improvement of claim 10 wherein the portion of the map being projected within the field of view of the operator provides a generally three-dimension image.

30. The improvement of claim 10 wherein the portion of the map being projected within the field of view of the operator simulates a generally three-dimension image.

31. The improvement of claim 10 wherein the processor includes an input interface operatively connected thereto, such that when the operator simultaneously views the real-world terrain and the map and compares the information contained in the map being projected with the features of the real-world terrain of the field, the operator may selectively enter data via the input interface.

32. The improvement of claim 31 wherein the data entered by the operator alters the agronomic plan.

33. The improvement of claim 31 wherein the data entered by the operator adjusts the application of the product to the field.

34. The improvement of claim 31 wherein the agronomic plan is associated with a database, and wherein the data entered by the operator is stored in the database.

35. The improvement of claim 10 wherein at least a portion of the information in the map projected within the field of view of the operator is graphical.

36. The improvement of claim 10 wherein at least a portion of the information in the map projected within the field of view of the operator is pictorial.

37. The improvement of claim 10 wherein at least a portion of the information in the map projected within the field of view of the operator is symbolic.

38. The improvement of claim 10 wherein at least a portion of the information in the map projected within the field of view of the operator is alphanumeric.

39. The improvement of claim 10 wherein the system further comprises:

a sensor, said sensor measuring a predetermined characteristic in the field as the vehicle traverses the field, said sensor generating a data signal corresponding to the measurement of said predetermined characteristic, wherein at least a portion of the information being projected in the field of view of the operator is updated periodically in response to said data signal generated by said sensor.

40. The improvement of claim 39 wherein the portion of the information being projected that is updated periodically in response to the data signal generated by the sensor is presented as a change in a color of a portion of the map.

41. The improvement of claim 40 wherein the real-world terrain includes a horizon line, and the portion of the map that is updated periodically in response to the data signal generated by the sensor is disposed above said horizon line from the perspective of the operator.

* * * * *